A. E. LEMIEUX.
BALL BEARING.
APPLICATION FILED MAR. 28, 1917.
1,226,782.   Patented May 22, 1917.
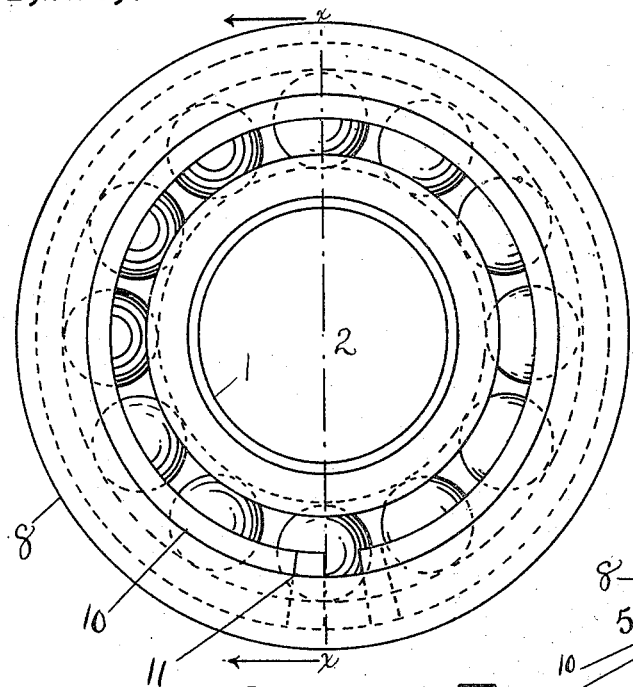
Fig-1-
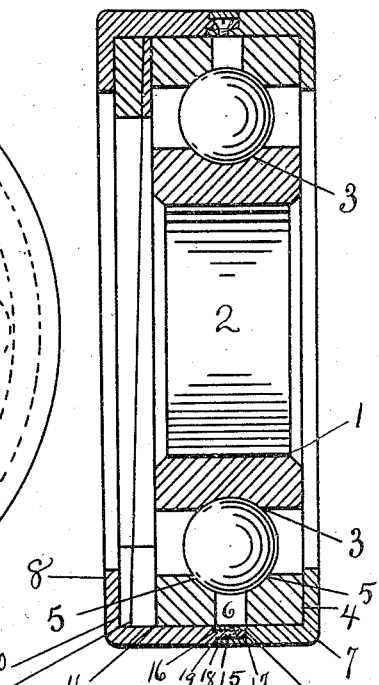
Fig-2-
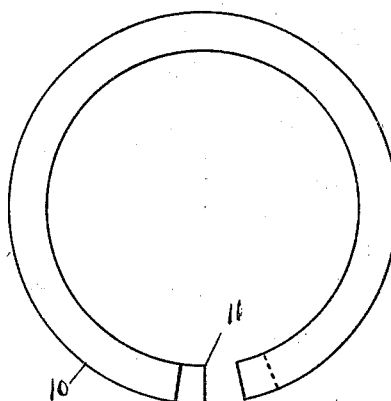
Fig-3-
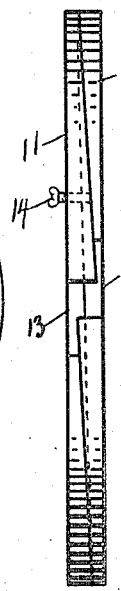
Fig-4-
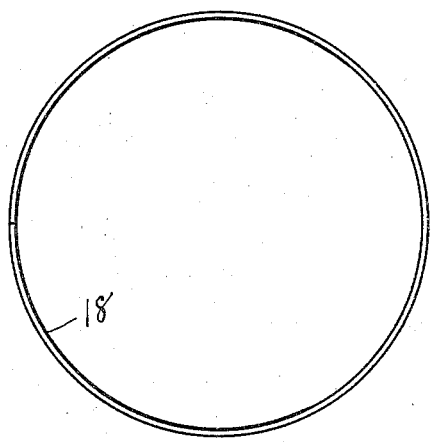
Fig-5-
INVENTOR-
Alphonse E. Lemieux
By Elgin le Vrnel
Attorney

UNITED STATES PATENT OFFICE.

ALPHONSE E. LEMIEUX, OF PORTLAND, MAINE.

BALL-BEARING.

1,226,782.　　　　　Specification of Letters Patent.　　Patented May 22, 1917.

Application filed March 28, 1917. Serial No. 157,880.

*To all whom it may concern:*

Be it known that I, ALPHONSE E. LEMIEUX, a citizen of the United States, residing at Portland, in the county of Cumberland and State of Maine, have invented certain new and useful Improvements in Ball-Bearings, of which the following is a specification.

This invention relates to improvements in ball bearings and specially to means for housing and adjusting them. It is adapted to be used in a variety of places and in connection with any revolving shaft or it may itself revolve around a fixed shaft.

In the accompanying drawings which illustrate a very satisfactory embodiment of my invention, Figure 1 is a side elevation of my improved ball bearing; Fig. 2 is a diametric sectional view of the same taken on line *x—x* looking to the left; Fig. 3 is a side elevation of the wedge rings; Fig. 4 is an edge view of the wedge rings, and Fig. 5 is an elevation of the band ring.

The same reference characters indicate like parts in the several figures.

Referring now to the drawings, 1 is a ring adapted to be secured to a shaft not shown, which ring is provided with a shaft receiving opening 2 and in the periphery with a grooved ball race 3. Adapted to be placed outside of balls placed in the ball race 3 are two rings 4, each provided with a ball race 5. When rings 4 are placed in position they will be spaced apart as seen at 6. Surrounding rings 4 and adapted to confine the moving parts is a two part housing comprising flanged members 7 and 8 which are adapted to have threaded engagement in the periphery as seen at 9, whereby they may be readily and quickly assembled and separated, permitting the movable parts also to be readily assembled and separated whenever required for any purpose. The housing is wider than the permanent race ring 1 to provide a space for the introduction of the adjusting means which consists of two similar wedge-shaped rings 10 and 11. These rings are provided with means whereby they may be caused to rotate one relative to the other. Any means which provides for this movement may be employed. As shown the rings have a small section broken out as seen at 12 and 13 to admit an expanding tool engaging one end of each ring. It will be evident that the movement of one ring relative to the other will increase or diminish the thickness of the two taken together, according to the direction in which the parts are rotated, thus adjusting the two part ball ring to take up any wear of the parts. The rings may be locked together when desired by means of a set screw 14 mounted in one of the rings and adapted to pass through it and to frictionally engage the other. Other means may, however, be employed for this purpose. The two parts of the housing are locked together by screws 15 passing through the overlapping parts 16 and 17 and the screws are held against accidental loosening by a circular band 18 adapted to be placed in a countersunk groove 19 extending around and over said overlapping parts.

I claim:

1. In a device of the character described, an inner ring and an outer ring comprising two members spaced apart, said rings being provided with ball races in their adjacent faces, a housing and means for adjusting the members of the outer ring comprising two wedged-shaped rings interposed between the ball rings and the housing.

2. In a device of the character described, an inner ring and an outer ring comprised of two members spaced apart, said rings being provided with ball races in their adjacent faces, a housing and means for adjusting the ball rings comprising two segmental wedge-shaped rings interposed between the ball rings and the housing.

3. In a device of the character described, a housing, an inner ring and an outer ring comprising two members spaced apart, said rings being provided with ball races in their adjacent faces and means for adjusting the ball rings comprising two wedge-shaped rings interposed between the ball rings and the housing and means for locking the adjusting rings together in any given position.

4. In a device of the character described, an inner ring and an outer ring comprising two members spaced apart, said rings being provided with ball races in their adjacent faces, a housing divided circumferentially, the two parts having threaded engagement, and means for adjusting the members of the outer ring comprising two wedge-shaped rings interposed between the ball rings and the housing.

5. In a device of the character described, an inner ring, an outer ring comprising two members spaced apart, said rings being provided with ball races in their adjacent faces, a housing comprising two members divided circumferentially and have threaded engagement, a groove in the housing over the overlapping parts, removable locking means engaging said overlapping parts within said groove, a ring mounted in said groove to prevent accidental displacement of said locking means and means for adjusting the members of the outer ring adapted to be inserted between said ball rings and said housing.

In testimony whereof I affix my signature.

ALPHONSE E. LEMIEUX.